United States Patent
Muraki (10) Patent No.: US 7,102,070 B2
(45) Date of Patent: Sep. 5, 2006

(54) MUSICAL TONE REPRODUCING APPARATUS AND METHOD AND PORTABLE TERMINAL APPARATUS

(75) Inventor: Yasuyuki Muraki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 105 days.

(21) Appl. No.: 10/469,724

(22) PCT Filed: May 22, 2002

(86) PCT No.: PCT/JP02/04951

§ 371 (c)(1),
(2), (4) Date: Sep. 2, 2003

(87) PCT Pub. No.: WO02/097787

PCT Pub. Date: Dec. 5, 2002

(65) Prior Publication Data

US 2004/0069120 A1   Apr. 15, 2004

(30) Foreign Application Priority Data

May 25, 2001 (JP) .............................. 2001-156623

(51) Int. Cl.
A63H 5/00 (2006.01)
G04B 13/00 (2006.01)
G10H 7/00 (2006.01)

(52) U.S. Cl. ...................................................... 84/609

(58) Field of Classification Search .......... 84/600–602, 84/609

See application file for complete search history.

(56) References Cited

U.S. PATENT DOCUMENTS 5,357,046 A   10/1994   Matsui et al.
6,150,598 A   11/2000   Suzuki et al.

FOREIGN PATENT DOCUMENTS

| EP | 1073034 | 1/2001 |
|---|---|---|
| JP | 10-187155 | 7/1998 |
| JP | 10319958 | 12/1998 |
| JP | 2000056759 | 2/2000 |
| JP | 2000-187483 | 7/2000 |
| JP | 2001-51678 | 2/2001 |

Primary Examiner—Jeffrey W Donels
(74) Attorney, Agent, or Firm—Morrison & Foerster LLP (57) ABSTRACT

There is provided a musical tone reproducing apparatus which is capable of recovering proper timing of musical tone generation even in a situation where processing of events takes much time such that the sounding timing of musical tones is delayed. Duration data read out from a FIFO 30 are added together by a duration forward counter 32b. A comparator circuit 32d compares the count value of an absolute time counter 32c and the count value of the duration forward counter 32b, and delivers the comparison result i to a FIFO controller 3 when the former becomes equal to or more than the latter. The FIFO controller 31 causes the FIFO 30 to read out event information and delivers the same to a decoder 32a, which in turn converts the event information into tone generator control data having a format peculiar to a tone generator 33 and delivers the same data to a register write controller 32e. The register write controller 32e writes an associated tone generator parameter into a tone generator control register within the tone generator 33, and the tone generator 33 reproduces and outputs musical tones based on the tone generator parameter.

5 Claims, 8 Drawing Sheets

|     | DURATION | EVENT |
|-----|----------|-------|
| (1) | 01 | TONE COLOR SETTING 1 |
|     | 00 | TONE COLOR SETTING 2 |
|     | ⋮  | ⋮ |
|     | 00 | TONE COLOR SETTING N |
| (2) | 01 | VOLUME SETTING |
| (3) | 01 | KEY ON |
| (4) | 05 | KEY OFF |

MUSICAL TONE REPRODUCING APPARATUS AND METHOD AND PORTABLE TERMINAL APPARATUS

CROSS-REFERENCE TO RELATED APPLICATIONS

This is a national stage under 35 USC § 371 of International Application PCT/JP02/04951, filed May 22, 2002, which claims priority benefit of Japanese Patent Application No. 2001-156623, May 25, 2001. The entire contents of those applications are hereby incorporated by reference herein.

BACKGROUND OF THE INVENTION

1. Technical Field

The present invention relates to a musical tone reproducing apparatus and a musical tone reproducing method which can be suitably applied to portable terminal apparatuses to generate melody tones.

2. Background Art

Conventional musical tone reproducing apparatuses include a type which generates musical tones using hardware.

Figure 13:
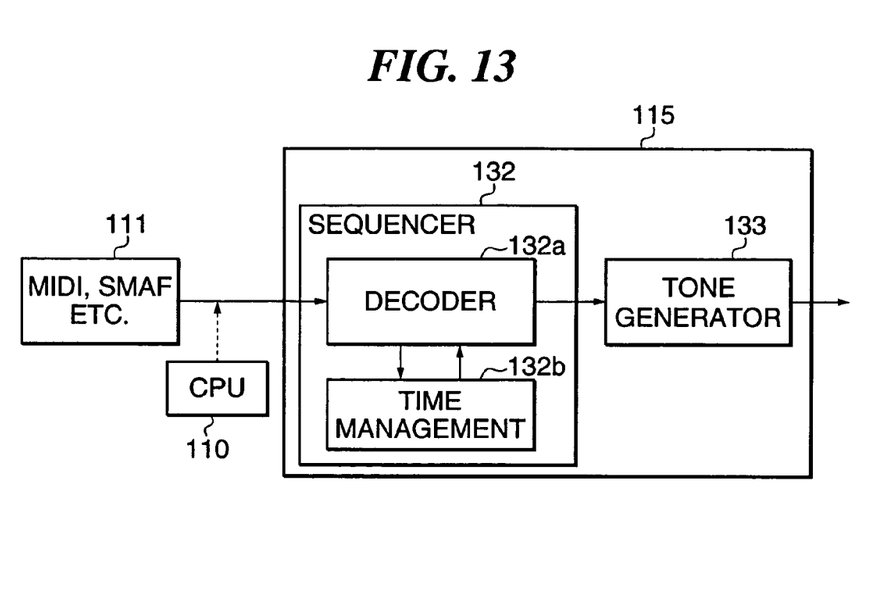
FIG. 13 is a diagram showing an example of the construction of a conventional musical tone reproducing apparatus.

FIG. 13 shows an example of the construction of a conventional musical tone reproducing apparatus of this type. In FIG. 13, a CPU (Central Processing Unit) 110 controls supply of music contents data 111, such as MIDI (Musical Instrument Digital Interface) data and SMAF (Synthetic Music Mobile Application Format) data, hereinafter described, to a tone generator hardware section 15. In this case, the MIDI data and SMAF data are transferred from external apparatuses or read from storage means. The tone generator hardware section 115 is comprised of a sequencer 132, and a tone generator 133. The sequencer 132 is comprised of a decoder 132a that converts sequence data such as MIDI data or SMAF data into control data having a format peculiar to the tone generator 133, and a time management section 132b that controls musical tone reproduction time according to time management information contained in the control data. In the musical tone reproducing apparatus constructed as above, in reproduction of musical tones, the time management section 132b gives the decoder 132a instructions to output the control data for reproduction of musical tones, in timing based on duration data indicative of time intervals between events contained in the control data and gate time data indicative of sounding time periods. In response to the instructions, the decoder 132a outputs the control data to the tone generator 133. The tone generator 133 in turn generates and outputs musical tones based on the supplied control data. Thus, musical tones are reproduced.

Figure 14:
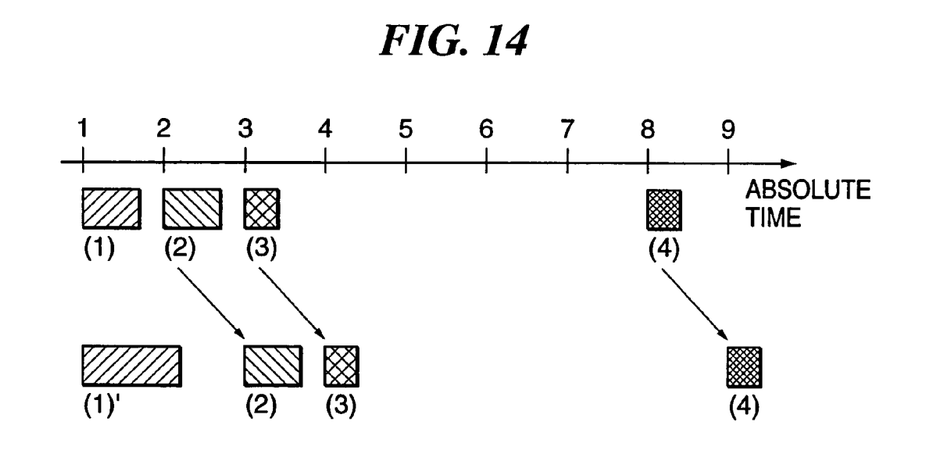
FIG. 14 is a diagram showing an example of timing of processing carried out by the conventional musical tone reproducing apparatus.

In the conventional musical tone reproducing apparatus, the sequencer 132 carries out conversion of the music contents data and time management. Therefore, in the case where many events occur at the same time, for example, the processing capacity of the sequencer 132 increases, which can result in inability to complete processing of the data for all the events in a unit time. For example, how the processing is carried out will be described with reference to FIG. 14 in which absolute time elapsed during musical tone reproduction is shown on the abscissa. In FIG. 14, reference numerals (1) to (4) represent events which are processed by the sequencer 132. An event (1), to which duration data "1" is allotted, is to be processed in timing of absolute time "1", an event (2) following the event (1), to which duration data "1" is allotted, is to be processed in timing of absolute time "2", is to be processed in timing of absolute time, an event (3) following the event (2), to which duration data "1" is allotted, is to be processed in timing of absolute time "3", and an event (4) following the event (3), to which duration data "5" is allotted, is to be processed in timing of absolute time "8". If the processing is properly carried out in accordance with the above-mentioned timing, musical tones are reproduced and sounded by the tone generator 188 in proper timing in accordance with the contents of the sequence data. The absolute times are set in terms of unit time.

However, if it takes much time to carry out processing of the event (1) so that the processing of this event cannot be completed within the unit time and is completed after the absolute time "2", as indicated as (1)' in a lower part of FIG. 14, the event (2) to be processed in timing of the absolute time "2" is processed in timing of the absolute time "3", the event (3) to be processed in timing of the absolute time "3" is processed in timing of the absolute time "4", and the event (4) to be processed in timing of the absolute time "8" is processed in timing of the absolute time "9". Thus, the events that cannot be completely processed within the respective unit times are processed in delayed timing. Consequently, if an event cannot be completely processed within the unit time, the corresponding control data is supplied to the tone generator 133 in timing delayed from the time point at which the control data should be properly supplied to the tone generator 133, and accordingly sounding timing of subsequent musical tones is delayed. Mobile phones in particular have a function of displaying images in synchronism with incoming call music, and a function of vibrating the casing of the phone and/or lighting on/off various buttons in synchronism with incoming call music. In performing such functions, if the sounding timing of musical tones is delayed, the functions are performed out of synchronism with incoming call music.

It is therefore an object of the present invention to provide a musical tone reproducing apparatus and a musical tone reproducing method which are capable of recovering proper timing of musical tone generation even in a situation where processing of events takes much time such that the sounding timing of musical tones is delayed, and a portable terminal apparatus having the musical tone reproducing apparatus.

DISCLOSURE OF THE INVENTION

To attain the above object, the present invention provides a musical tone reproducing apparatus which is connected respectively to an external system controller for carrying out a process other than a musical tone reproducing process as a main process and to an external storage, the external storage storing the performance data consisting of event information representative of contents of events and duration information representative of time intervals between occurrence of events and occurrence of preceding events, and for performing reproduction of musical tone based on the performance data supplied from the external storage, comprising a temporary storage for temporarily storing the performance data supplied sequentially from the external storage by a predetermined amount, a forward counter for accumulating the duration information of the performance data temporarily stored in the temporary storage to indicate a count value of time at which musical tones are to be generated based on the event information corresponding to the duration information, a time counter for counting up at intervals of a unit time to indicate a count value of absolute time, a readout controller for comparing the count value of the time counter with the count value of the forward counter, and for controlling the temporary storage to read out the event information corresponding to the accumulated duration information of the performance data stored in the temporary storage based on a comparison result between the count values of the time counter and of the forward counter, a data generator for generating control data based on the event information read out and transferred from the readout controller, and a tone generator for generating musical tones based on the control data.

To attain the above object, the present invention provides a musical tone reproducing apparatus which is connected respectively to an external system controller for carrying out a process other than a musical tone reproducing process as a main process and to an external storage, the external storage storing the performance data consisting of event information representative of contents of events and duration information representative of time intervals between occurrence of events and occurrence of preceding events, comprising a temporary storage for storing control data supplied sequentially from the external storage by a predetermined amount when musical tones are reproduced, the control data being generated by the external system controller based upon the performance data before reproducing musical tones, and the control data including duration information and event information stored in the external storage, a forward counter for accumulating the duration information included in the control data temporarily stored in the temporary storage to indicate count value of time at which musical tones are to be generated based on the event information corresponding to the duration information, a time counter for counting up at intervals of a unit time to indicate count value of absolute time, a readout controller for comparing the count value of the time counter with the count value of the forward counter, and for controlling the temporary storage to read out the event information corresponding to the accumulated duration information of the performance data stored in the temporary storage based on the comparison results between the count values of the time counter and of the forward counter, and a tone generator for generating musical tones based on the read out event information.

To attain the above object, the present invention also provides a portable terminal apparatus having a musical tone reproducing apparatus, wherein the system controller carries out a portable terminal function process as the main process.

In a preferred form of the present invention, the musical tone reproducing apparatus according to the present invention, wherein the readout controller controls the temporary storage to read out the event information when the count value of the time counter becomes equal to or more than the count value of the forward counter.

To attain the above object, the present invention further provides a tone reproducing method applied to a musical tone reproducing apparatus which is connected respectively to an external system controller for carrying out a process other than a musical tone reproducing process as a main process and to an external storage, the external storage storing the performance data consisting of event information representative of contents of events and duration information representative of time intervals between occurrence of events and occurrence of preceding events, and for performing reproduction of musical tone based on the performance data supplied from the external storage, comprising a temporarily storing step of temporarily storing the performance data supplied sequentially from the external storage by a predetermined amount, a forward counting step of accumulating the duration information of the performance data temporarily stored in the temporary storage to indicate a count value of time at which musical tones are to be generated based on the event information corresponding to the duration information, a time counting step of counting up at intervals of a unit time to indicate a count value of absolute time, a readout controlling step of comparing the count value of the time counting step with the count value of the forward counting step, and of controlling the temporary storage to read out the event information corresponding to the accumulated duration information of the performance data stored in the temporary storage based on a comparison result between the count values of the time counting step and of the forward counting step, a data generator for generating control data based on the event information read out and transferred from the readout controlling step; and a tone generating step of generating musical tones based on the control data.

With the above construction according to the present invention, since timing of reading out next event information is controlled based on the count values of forward counter and time counter, timing of sounding of musical tones is reproduced to proper and original timing even if there are large amount of event information occurring simultaneously and process in the data generator cannot be completed within a unit time.

Further, with the constructions according to the present invention, when the count value of the time counter becomes equal to or more than the count value of the forward counter, the control data generated from the corresponding event information is supplied to the tone generator. By doing so, even if there occurs a temporary delay in the supply of the control data in the course of musical tone reproduction, the control data can be supplied to the tone generator in timing indicated by the duration information. As a result, the timing of sounding of musical tones reproduced by the tone generator can be restored to proper or original timing.

Therefore, even when in a mobile phone to which the present invention is applied, an image is displayed, the casing of the mobile phone is vibrated, or various buttons are lighted on and off in synchronism with the reproduction of incoming call music, a delay in the sounding timing of musical tones can be eliminated to again bring these operations into synchronism with the reproduction of the generation of musical tones.

BEST MODE OF CARRYING OUT THE INVENTION

The present invention will now be described in detail with reference to the drawings showing a preferred embodiment thereof.

Figure 1:
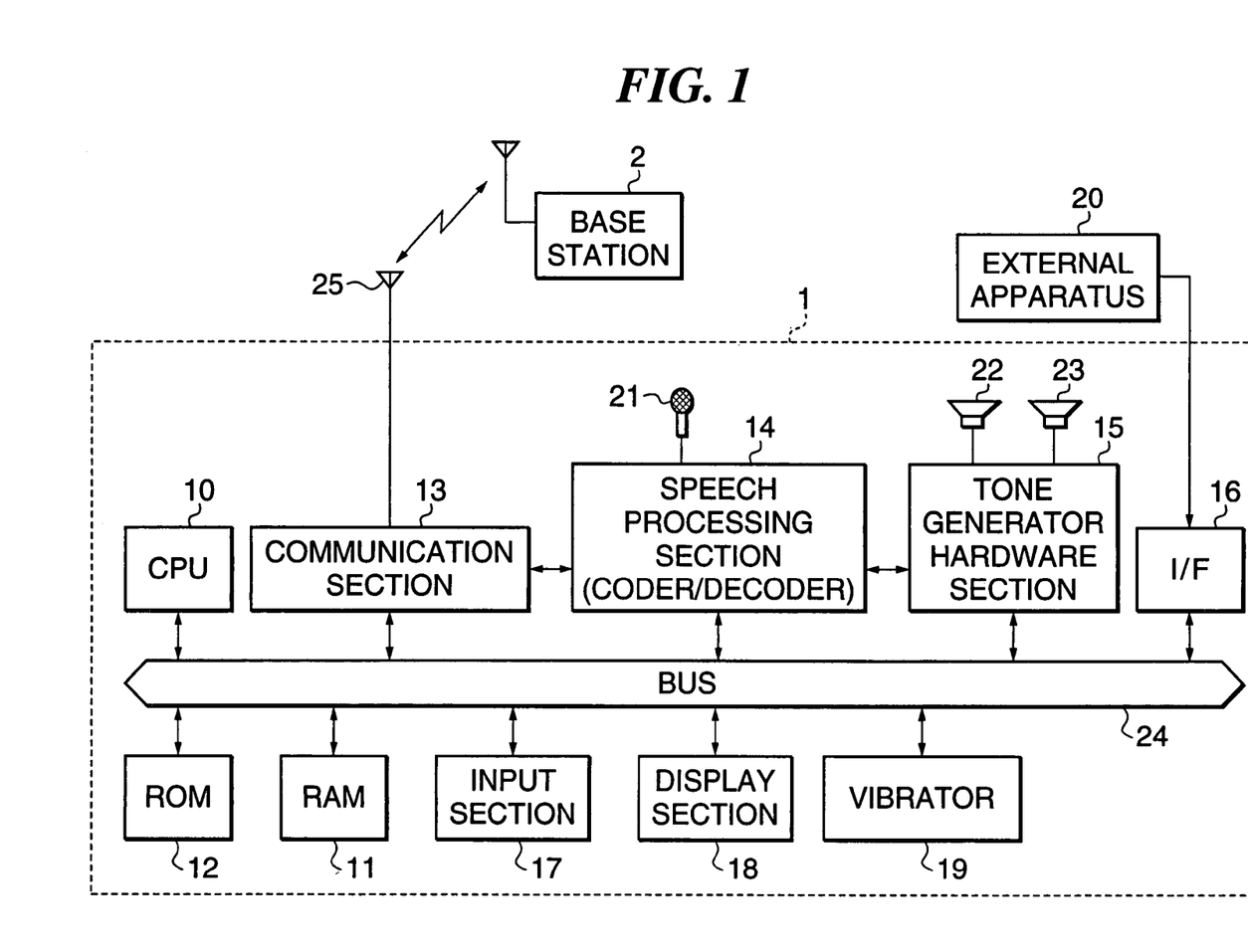
FIG. 1 is a diagram showing the construction of a mobile phone having a musical tone reproducing apparatus according to an embodiment of the present invention, to which is applied the present invention.

FIG. 1 is a diagram showing the construction of a mobile phone having a musical tone reproducing apparatus according to an embodiment of the present invention, to which is applied the present invention.

The mobile phone 1 shown in FIG. 1, which generally has a retractable antenna 25, can be connected to a base station 2 by a wireless communication line. The antenna 25 is connected to a communication section 13 having functions of modulation and demodulation. A CPU (Central Processing Unit) 10 serves as a system control section that controls operations of various sections of the mobile phone 1 by executing telephone function programs, and is provided with a timer that shows elapsed time in the operations and generates a timer interrupt at predetermined time intervals. Further, the CPU 10 transfers music contents data in predetermined amounts to a tone generator hardware section 15 during musical tone reproduction carried out upon receipt of an incoming call, for example. A RAM (Random Access Memory) 11 has a storage area for music contents data having a delivery format downloaded from a download center or the like connected to a network via the base station 2, and a work area for the CPU 10. A ROM 12 stores various programs including various phone function programs for carrying out transmission and reception functions, and programs for carrying out musical tone reproduction and the like, and various kinds of data such as preset music contents data.

The communication section 13 demodulates a signal received by the antenna 25 and modulates and supplies a signal to be transmitted to the antenna 25. An incoming speech signal demodulated by the communication section 13 is decoded by a speech processing section (coder/decoder) 14, and a speech signal inputted via a microphone 21 is compression decoded by the speech processing section 14. The speech processing section 14, which subjects a speech signal to high efficiency compression encoding/decoding, is provided with a coder/decoder of the CELP (Code Excited LPC) system or the ADPCM (Adaptive Differential PCM Coding) system. A tone generator hardware section 15 is adapted to sound the incoming speech signal from the speech processing section 14 through a loud speaker 22 for speech, and generate and output incoming call music and a hold tone by reproducing the musical contents data when a call is received. The incoming call music is outputted from a loud speaker 23 for incoming calls, and the hold tone is mixed with the incoming speech signal and is outputted from the loud speaker 22 for speech.

The music contents data has a MIDI (Musical Instrument Digital Interface) format or a SMAF (Synthetic Music Mobile Application Format) format convenient for delivery. The tone generator hardware section 15 converts music contents data of these formats into control data of a format peculiar to the tone generator hardware section 15 and reproduces the converted data. Alternatively, the CPU 10 may convert the music contents data of the above formats into control data of a format peculiar to the tone generator hardware section 15, stores the converted data in the RAM 11 and read out the same from the RAM 11 and supply the same to the tone generator hardware section 15 during reproduction. The tone generator hardware section 5 has provided therein a FIFO that temporarily stores a predetermined amount of music contents data. This FIFO may have a capacity for storing music contents data for one music composition, but if the capacity of the FIFO is so small that music contents data for one music composition cannot be stored in the FIFO, it may be arranged such that when an empty area of a predetermined amount of data occurs in the FIFO, the tone generator hardware section 15 delivers a FIFO data request signal to the CPU 10, and then the CPU 10 reads out a continued part of the music contents data stored in the RAM 11 or the ROM 12 and transfers the same to the tone generator hardware section 15. By this alternative arrangement, even if a small-capacity FIFO is used, a music composition based on a large amount of music contents data can be reproduced.

An interface (I/F) 16 is for downloading music contents data and the like from an external apparatus 20 such as a personal computer. An input section serves as input means comprised of dial buttons for numerical values "0" to "9" and various other buttons provided in the present mobile phone 1. A display section 18 is comprised of a display device which performs displays according to operations of buttons such as menu buttons and the dial buttons for phone functions. A vibrator 19 notifies a user of incoming calls by vibrating the main body casing of the mobile phone 1 instead of generating incoming call music.

Figure 2:
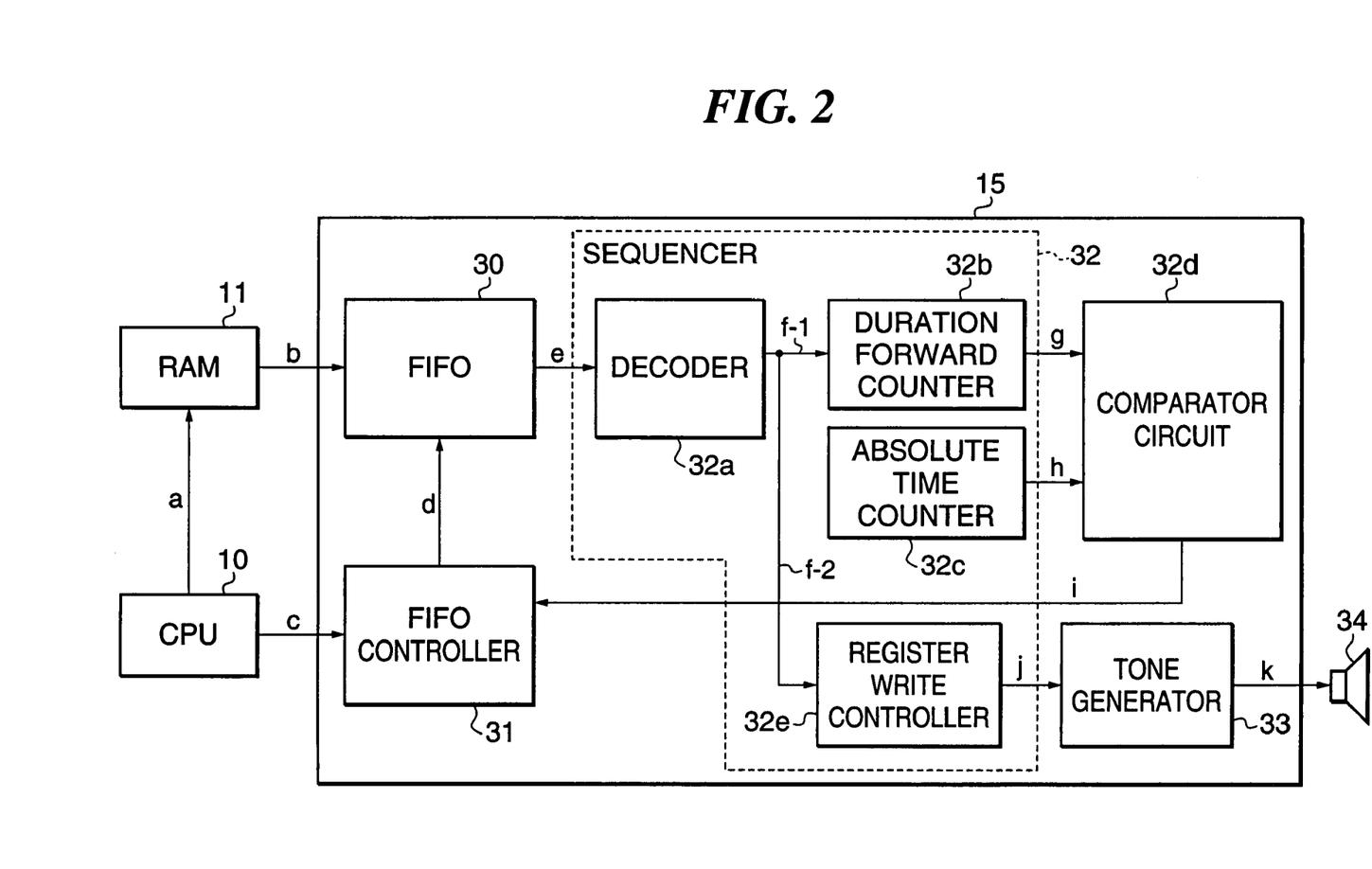
FIG. 2 is a diagram showing the construction of the musical tone reproducing apparatus according to the embodiment of the present invention.

Next, FIG. 2 shows the construction of the musical tone reproducing apparatus provided in the mobile phone 1 according to the present embodiment. In FIG. 2, the constructions of the loud speaker 22 for speech, loud speaker 23 for incoming calls, and their related parts are omitted. In FIG. 2, the CPU 10, the tone generator hardware section 15 and the RAM 11 are connected to each other via a bus 24 for data transmission and reception therebetween, though not shown in the figure.

In the musical tone reproducing apparatus in FIG. 2, the RAM 11 stores music contents data such as MIDI and SMAF in the forms of files. The RAM 11 has such a capacity that music contents data for a plurality of music compositions which are downloaded or read from the external apparatus 20 can be stored.

Figure 3A:
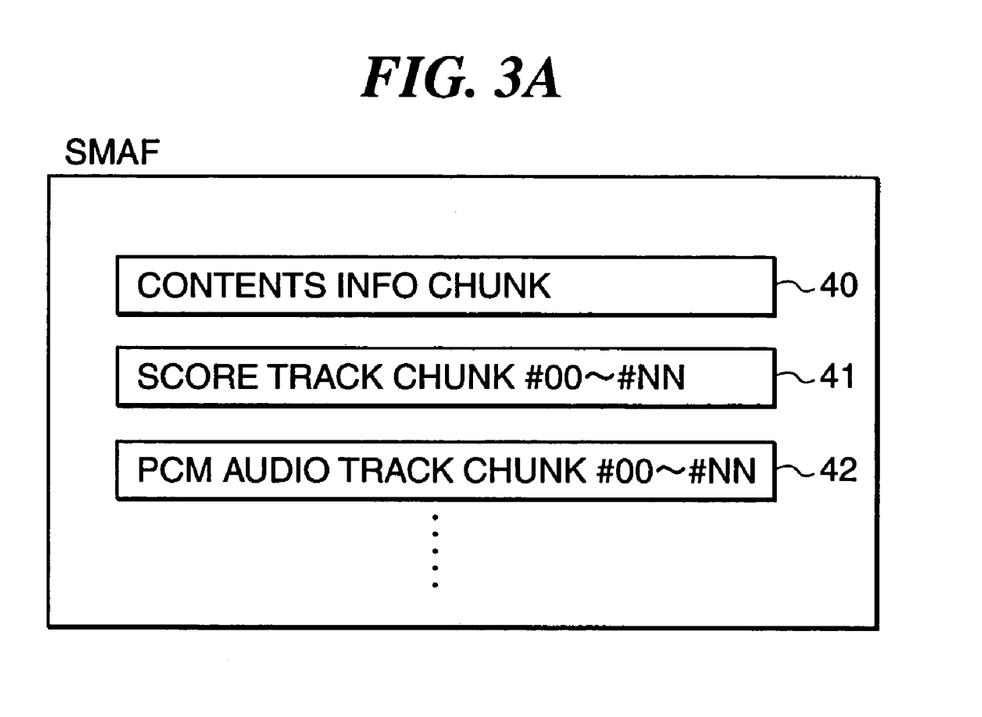
FIGS. 3A and 3B are diagrams showing the structure of SMAF data and the structure of score track chunk data in the SMAF data structure, respectively.
Figure 3B:
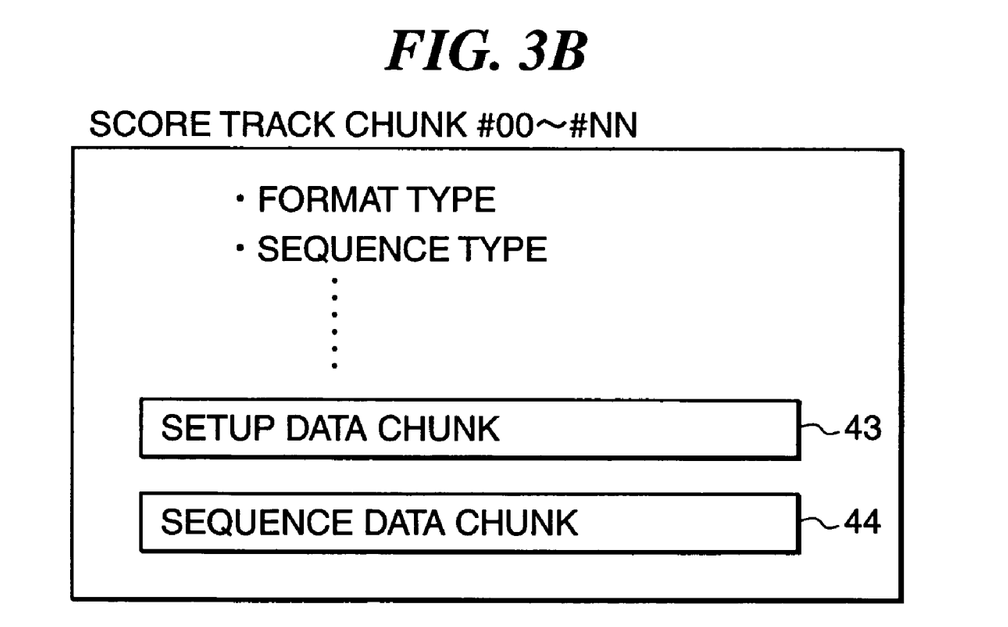
Figure 4:
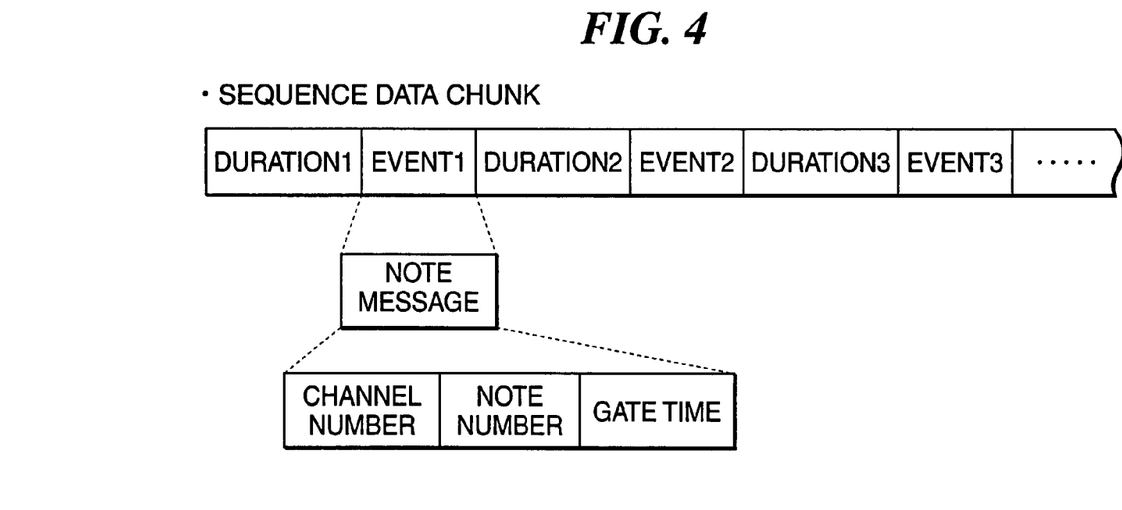
FIG. 4 is a diagram showing the structure of data of sequence data chunk in the score track chunk data in SMAF.

Here, the SMAF format will be described. The structure of SMAF format data is shown in FIGS. 3A and 3B and FIG. 4. The SMAF data shown in FIG. 3A is comprised of a plurality of chunks such as a contents information chunk (Contents Info Chunk) 40, a score track chunk (Score Track Chunk) 41, a PCM audio track chunk (PCM Audio Track Chunk) 42, and so forth. The contents information chunk 40 contains information on contents and definitions of the same, the score track chunk 41 stores tone generator sequence tracks, and the PCM audio track chunk 42 stores compressed audio sounding data of the PCM system such as ADPCM, MP3 (MPEG Audio Layer 3), and TwinVQ in the form of events.

The structure of the data of the score track chunk 41 is shown in FIG. 3B. As shown in FIG. 3B, the score track chunk 41 is comprised of data of a format type (Format Type), a sequence type (Sequence Type), and the like, and chunks such as a setup data chunk (Setup Data Chunk) 43 and a sequence data chunk (Sequence Data Chunk) 44. The format type data indicates a status that defines the real format of this chunk. For example, the real format can be defined as handy phone standard. The sequence type data indicates a type of one of two types of sequence data, and the type includes a stream sequence type and a sub sequence type. The setup data chunk 43 stores tone color data, effects-setting data, and so forth. The sequence chunk 44 stores sequence data which is used as real performance data.

Next, the structure of the sequence data stored in the sequence data chunk 44. As shown in FIG. 4, the sequence data is comprised of one byte of duration (Duration) data, and two or three bytes of event (Event) data, which are alternately arranged. In the illustrated example, it is assumed that duration data always exists before each piece of event data. The duration data is time information indicative of a time interval between each event located before the duration data and an event located after the duration data. The events include events such as a note message (Note Message) for controlling sounding, a control message (Control Message) for controlling volume, modulation, and the like, and an exclusive message (Exclusive Message) for transmitting information peculiar to the phone maker. Further, as shown in the figure, the note message is comprised of data such as a channel number (Channel Number) indicative of designated sounding channels, and a gate time (Gate Time) indicative of a sounding time period.

Figure 5:
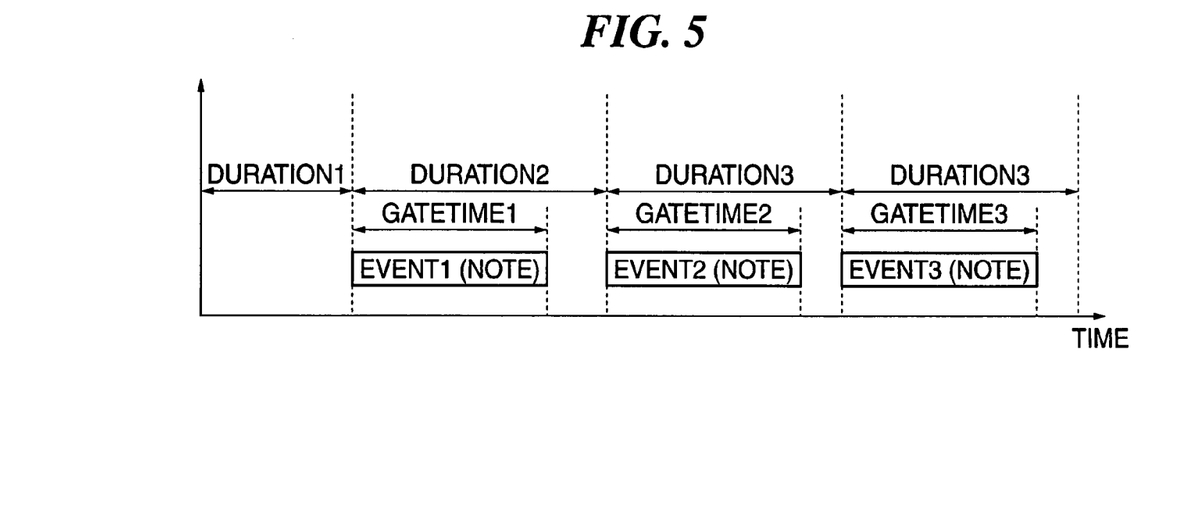
FIG. 5 is a diagram showing the sequence data in an example of the SMAF data, plotted along the time axis.

If the sequence data consisting of the duration data 1 to 3 and the event data 1 to 3 shown in FIG. 4 are plotted along the time axis, they appear as shown in FIG. 5. For example, if the event data 1 to 3 indicate, respectively, an event 1, an event 2 and an event 3 as note messages for note-on, sounding of a musical tone according to the event 1 is started upon the lapse of time or duration indicated by the duration data 1. Then, the sounding of the musical tone according to the event 1 is stopped upon the lapse of time indicated by a gate time 1. Then, sounding of a musical tone according to the event 2 is started upon the lapse of time indicated by the duration data 2 following the lapse of the time indicated by the duration data 1. Next, the sounding of the musical tone according to the event 2 is stopped upon the lapse of time indicated by a gate time 2 after the start of the sounding according to the event 2. Then, sounding of a musical tone according to the event 3 is started upon the lapse of time indicated by the duration data 3 following the lapse of the time indicated by the duration data 2. Then, the sounding according to the event 3 is stopped upon the lapse of time indicated by a gate time 3 after the start of the sounding according to the event 3. In the following description, it is assumed that the musical tone reproducing apparatus according to the present invention shown in FIG. 2 reproduces the sequence data shown in FIG. 4.

The tone generator hardware section 5 appearing in FIG. 2 has a FIFO 30 that temporarily stores a predetermined amount of sequence data. A predetermined amount of sequence data b is read from the RAM 11 and stored in the FIFO 30 under the control of the CPU 10. At this time, the CPU 10 sends a write signal c to the FIFO controller 31, which operates in response to the write signal c to write the sequence data b read from the RAM 11 into the FIFO 30 at a given address location. Then, when musical tone reproduction is started in response to a command from the CPU 10, the FIFO controller 31 sends a read signal/address d to the FIFO 30, which, in response to the read signal/address d, reads sequence data e from an address location corresponding to the read signal/address d and supplies the same to a sequencer 32. Thus, the FIFO 30 serves as a first-in first-out storage means from which previously written sequence data are sequentially read out. If an empty area of a predetermined amount occurs in the FIFO 30 due to reading-out of sequence data, the FIFO 30 sends a FIFO data request signal to the CPU 10 to request transfer of subsequent sequence data. Thus, even if the FIFO 30 has a small capacity, a musical composition requiring a large amount of sequence data can be reproduced.

The sequencer 32 of the tone generator hardware section 15 is comprised of a decoder 32a that converts the supplied sequence data into tone generator control data of a format peculiar to a tone generator 33, a register write controller 32e that writes the tone generator control data for musical tone reproduction into a tone generator control register of the tone generator 33, a duration forward counter 32b, and a time management section that is comprised of an absolute time counter 32c and a comparator circuit 32d and controls a reproduction time for musical tones. The sequence data e read from the FIFO 30 is converted into tone generator control data by the decoder 32a, and out of the converted tone generator control data, duration data f-1 is delivered to the duration forward counter 32b, and event data f-2 is delivered to the register write controller 32e. The duration data f-1 at the head of the sequence data forms duration information as shown in FIG. 5, and accordingly the duration data f-1 is first outputted from the decoder 32a, which is delivered to the duration forward counter 32b. The duration forward counter 32b adds the delivered duration data f-1 that indicates a time interval between events concerned to a present count value of the duration forward counter 32b. That is, in the duration forward counter 32b, duration data indicative of relative time values are accumulated, the occurrence time of the corresponding event is indicated in terms of absolute time from the start of reproduction of musical tones.

The absolute time counter 32c that constitutes the time management section counts up every unit time after the start of reproduction of musical tones and thus indicates absolute time elapsed from the start of reproduction. The absolute time counter 32c may be constructed to count up in response to a timer interrupt that generated at intervals of the unit time. The absolute time counter 32c delivers an absolute time count value h indicative of absolute time elapsed from the start of reproduction of musical tones to the comparator circuit 32d. A count value g indicative of the accumulated duration data (duration absolute time value) from the duration forward counter 32b is also delivered to the comparator circuit 32d, which in turn compares the count value g and the count value h. Here, when the absolute time counter 32c repeatedly counts up every unit time so that the count value h becomes equal to or more than the count value g, the comparator circuit 32d applies a significant comparison result i to the FIFO controller 31. The significant comparison result i means that the time indicated by the accumulated duration data has been reached. Upon receiving the significant comparison result i, the FIFO controller 31 causes the FIFO 30 to read out the next sequence data corresponding to the present duration data, which is delivered to the decoder 32*a*.

The sequence data delivered to the decoder 32*a* consists of the next event information following the duration information of the present duration data and the next duration information. This sequence data is converted into tone generator control data by the decoder 32*a*. Event data f-2 contained in the tone generator control data then outputted from the decoder 32*a* is delivered to the register control section 32*e*, and duration data f-1 contained in the outputted tone generator control data is added to the count value of the duration forward counter 32*b*. The register write controller 32*e* carries out control of writing the event data into the tone generator control register provided in the tone generator 33. Specifically, a tone generator parameter contained in the event data is written as write data j into a register within the tone generator control register at an address location of the tone generator control register indicated by address information contained in the event data. When the write data j is written into the tone generator control register of the tone generator 33, the tone generator 33 operates based on the write data j written into the tone generator control register to deliver musical tone reproducing data k to a speaker 34. In this way, when the time indicated by the duration data elapses, a musical tone based on the event data corresponding to the duration data is reproduced and sounded from the speaker 34.

When the absolute time counter 32*c* counts up every unit time so that the absolute time count value h again becomes equal to or more than the count value g, it means that the time indicated by the further accumulated duration data has been reached. Then, the comparator circuit 32*d* applies the significant comparison result i to the FIFO controller 31. Upon receipt of the significant comparison result i, the FIFO controller 31 causes the FIFO 30 to read out the next sequence data and deliver the same to the decoder 32*a*. The delivered sequence data consists of event information following the duration information of the above duration data and the next duration information. The decoder 32*a* converts the delivered sequence data into tone generator control data. Event data f-2 contained in the tone generator control data then outputted from the decoder 32*a* is delivered to the register control section 32*e*, and duration data f-1 contained in the outputted tone generator control data is added to the count value of the duration forward counter 32*b*. A tone generator parameter contained in the event data delivered to the register write controller 3*e* is written as write data j into a register within the tone generator control register at an address location indicated by address information contained in the event data. When the write data j is written into the tone generator control register of the tone generator 33, the tone generator 33 operates based on the write data j written into the tone generator control register to deliver musical tone reproducing data k to a speaker 34.

In this way, when the time indicated by the duration data elapses, a musical tone based on the event data corresponding to the duration data is reproduced and sounded from the speaker 34.

The above described processing is repeatedly carried out the sequence data until the processing of the sequence data is completed. That is, whenever the time indicated by the duration data elapses, the next event data is read out from the FIFO 30, and a musical tone is reproduced based on the readout event data, and duration data indicative of timing in which a musical tone based on the next event data is to be generated is added to the count value of the duration forward counter 32*b*, whereby musical tones are sequentially reproduced each in timing in which the time indicated by the duration data is reached.

Figure 6:
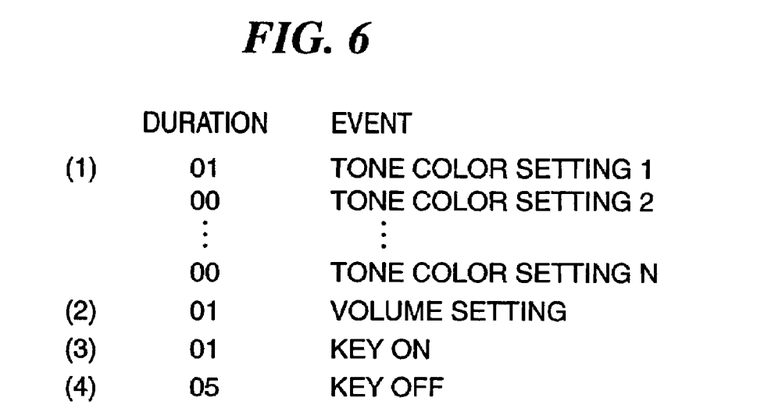
FIG. 6 shows an example of the sequence data used by the musical tone reproducing apparatus.
Figure 7:
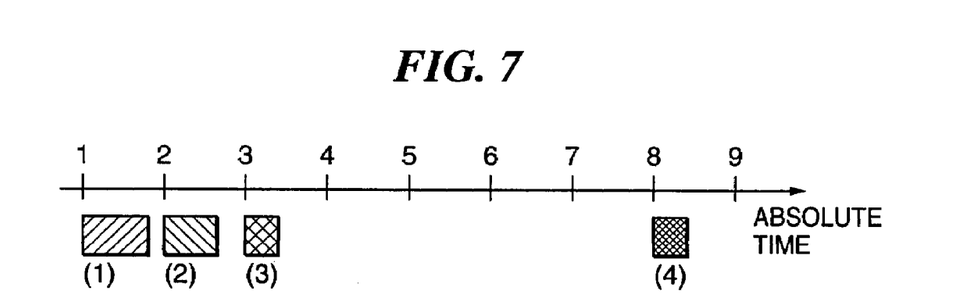
FIG. 7 is a diagram showing timing of processing carried out by the musical tone reproducing apparatus.

A specific example of this processing will now be described with reference to FIGS. 7 to 9, on the assumption that sequence data shown in FIG. 6 is read out from the FIFO 30.

In the sequence data shown in FIG. 6, the first event data has duration information indicative of one unit time "01". That is, duration data "01" outputted from the decoder 32*a* is added to the count value of the duration forward counter 32*b* so that the new count value becomes "1". Thereafter, when one unit time elapses so that the absolute time counter 32*c* counts up by "1" to provide a count value "1", the count value of the duration forward counter 32*b* and the count value of the absolute time counter 32*c* become equal to each other, that is, the time indicated by the duration data has been reached. Accordingly, a significant comparison result i is outputted from the comparator circuit 32*d* to the FIFO controller 31, which in turn controls the FIFO 30 to read out event information indicative of "Tone Color Setting 1" as well as the next duration information indicative of a duration "00". The readout event information indicative of "Tone Color Setting 1" that is for setting a tone color for a channel 1 is converted into event data indicating an address corresponding to an associated tone color parameter by the decoder 32*a*, and the converted event data is delivered to the register write controller 32*e*. Then, the register write controller 32*e* carries out control such that the tone color parameter for setting the tone color for the channel 1 is written as write data j into the tone generator control register of the tone generator 33 at a location indicated by the address of the event data. Thus, the tone color of the channel 1 to be reproduced by the tone generator 33 is set.

The above duration data read out from the FIFO 30 indicates a duration "00", and therefore the duration forward counter 32*b* does not count up and its count value remains "1". Consequently, the count value of the duration forward counter 32*b* and the count value of the absolute time counter 32*c* remain equal to each other so that the significant comparison result i continues to be outputted. Accordingly, the FIFO controller 31 causes the FIFO 30 to read out the next event information indicative of "Tone Color Setting 2" as well as the next duration information indicative of a duration "00". The readout event information indicative of "Tone Color Setting 2" that is for setting a tone color for a channel 2 is converted into event data indicating an address corresponding to an associated tone color parameter by the decoder 32*a*, and the converted event data is delivered to the register write controller 32*e*. Then, such that the tone color parameter for setting the tone color for the channel 2 is written as write data j into the tone generator control register of the tone generator 33 at a location indicated by the address of the event data. Thus, the tone color of the channel 2 to be reproduced by the tone generator 33 is set. The above processing is continuously carried out so long as the duration information read out from the FIFO 30 under the control of the FIFO controller 31 indicates the duration "00" so that tone color setting processes for channels 1 to N as shown in at (1) in FIG. 6 are continuously carried out. In other words, the tone color setting processes for the channels 1 to N are continuously carried out from timing of absolute time "1" as shown in FIG. 7.

Then, when event information for setting a tone color for the channel N is read out, duration information indicative of a duration "01" is read out from the FIFO 30 and delivered to the decoder 32a. The duration data "01" outputted from the decoder 32a is added to the count value of the duration forward counter 32b so that the duration forward counter 32b counts up by "1" corresponding to one unit time to provide a count value "2". This stops the significant comparison result i from being outputted. Then, the process waits for one unit time to elapse, and upon the lapse of one unit time, the absolute time counter 32c counts up by "1" to provide a count value "2", so that the count value of the duration forward counter 32b and the count value of the absolute time counter 32e again become equal to each other, whereby the significant comparison result i is again outputted from the comparator circuit 32d. Thus, event information indicative of "Volume Setting" is read out from the FIFO 30 under the control of the FIFO controller 31 and at the same time the next duration information indicative of a duration "01" is read out from the FIFO 30. The readout event information indicative of "Volume Setting" is converted into event data indicating an address corresponding to an associated volume parameter by the decoder 32a and the converted event data is delivered to the register write controller 32e. Then, the volume parameter for setting a volume value is written as write data j into the tone generator control register of the tone generator 33 at a location indicated by the address of the event data. In this way, the volume of musical tones reproduced by the tone generator 33 is controlled to a value thus set. That is, the volume setting process shown at (2) in FIG. 6 is carried out in timing of absolute time "2" as shown in FIG. 7.

The duration information indicative of the duration "01" read out from the FIFO 30 together with the event information indicative of "Volume Setting" is delivered to the decoder 32a. The duration data "01" outputted from the decoder 32a is added to the count value of the duration forward counter 32b so that the duration forward counter 32b counts up by "1" corresponding to one unit time to provide a count value "3", to stop the comparison result i from being outputted. The process then waits for one unit time to elapse, and upon the lapse of one unit time, the absolute time counter 32c counts up by "1" to provide a count value "3", whereby the count value of the duration forward counter 32b and the count value of the absolute time counter 32c again become equal to each other and hence the significant comparison result i is again outputted from the comparator circuit 32d. This causes event information indicative of "Key On" as well as the next duration information indicative of a duration "05" to be read out from the FIFO 3 under the control of the FIFO controller 31. The readout event information indicative of "Key On" is converted into event data indicating an address corresponding to an associated key on parameter by the decoder 32a and the converted event data is delivered to the register write controller 32e. Then, write data j formed by the key on parameter is written into the tone generator control register of the tone generator 33 at a location indicated by the address of the event data. This causes musical tones of a pitch indicated by the key on parameter to be reproduced with the previously set tone colors and volume by the tone generator 33. That is, the key on process shown at (3) in FIG. 6 is carried out in timing of absolute time "3" as shown in FIG. 7.

The duration information indicative of the duration "05" read out from the FIFO 30 together with the event information indicative of "Key On" is delivered to the decoder 32a. The duration data "05" outputted from the decoder 32a is added to the count value of the duration forward counter 32b so that the duration forward counter 32b counts up by "5" corresponding to five unit times to provide a count value "8", to stop the comparison result i from being outputted. The process then waits for five unit times to elapse, and upon the lapse of five unit times, the absolute time counter 32c counts up by "5" to provide a count value "8", whereby the count value of the duration forward counter 32b and the count value of the absolute time counter 32c again become equal to each other and hence the significant comparison result i is again outputted from the comparator circuit 32d. This causes the next event information indicative of "Key Off" to be read out from the FIFO 3 under the control of the FIFO controller 31. The readout event information indicative of "Key Off" is converted into event data indicating an address corresponding to an associated key off parameter by the decoder 32a and the converted event data is delivered to the register write controller 32e. Then, write data j formed by the key off parameter is written into the tone generator control register of the tone generator 33 at a location indicated by the address of the event data. This causes a musical tone indicated by the key off parameter and being sounded to be keyed off or damped by the tone generator 33. That is, the key off process shown at (4) in FIG. 6 is carried out in timing of absolute time "8" as shown in FIG. 7.

It should be noted that the tone color setting processes shown at (1) in FIG. 6 are carried out for the channels 1 to N. Therefore, if the processing speed of the tone generator hardware section 15 is low, there is a possibility that all the tone color setting processes cannot be completed within one unit time and may be continued even after the next unit time is reached. In such a case, according to the conventional musical tone reproducing apparatus, as previously described with reference to FIG. 14, there can occur a delay in the timing of sounding of subsequent musical tones. On the other hand, according to the musical tone reproducing apparatus of the present invention, the timing of sounding of subsequent musical tones can be restored to the original timing. Therefore, even when in the mobile phone 1 an image is displayed on the display section 18, the casing of the mobile phone 1 is vibrated or various buttons of the input section 17 are lighted on and off in synchronism with the reproduction of incoming call music reproduced by the tone generator hardware section 15, a delay in the sounding timing of the incoming call music can be eliminated to again bring these operations into synchronism with the reproduction of the incoming call music.

Figure 8:
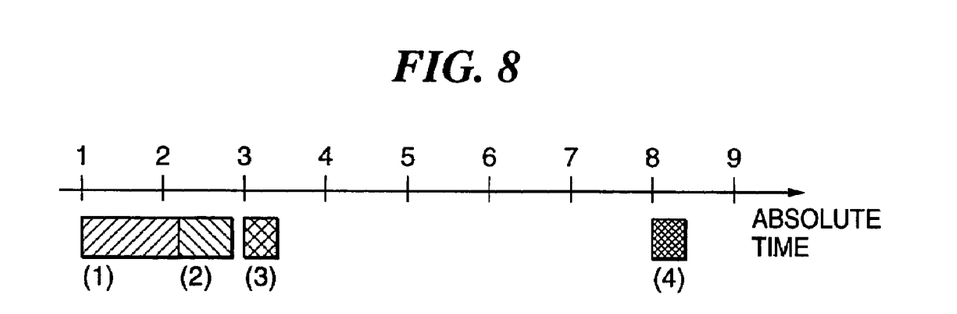
FIG. 8 is a diagram showing another example of the timing of processing carried out by the musical tone reproducing apparatus.

More specifically, as shown in FIG. 8, even if the processing time of the process shown at (1) in the figure extends beyond the absolute time "2", the absolute time counter 32c counts up in timing of the absolute time "2" to provide a new count value "2". Thus, the count value of the duration forward counter 32b and the count value of the absolute time counter 32c become equal to each other, so that the comparator circuit 32s outputs the significant comparison result i. In this case, the event information indicative of "Volume Setting" as the next event data shown at (2) is read out from the FIFO 30 under the control of the FIFO controller 31 together with the next duration data indicative of the duration "01". But, at this time, all the event data for the tone color setting processes shown at (1) have not been read out yet. Accordingly, immediately when all the event data for the tone color setting processes shown at (1) are read out from the FIFO 30, the event information indicative of "Volume Setting" and the next duration data indicative of the duration "01" shown at (2) are read out. Consequently, the volume setting process shown at (2) in FIG. 8 is carried out continuously from the execution of the tone color setting process shown at (1), and the volume setting process shown at (2) is completed before the time indicated by the absolute time "3" is reached. Accordingly, the key-on process shown at (3) and the key-off process shown at (4) are carried out in proper timing. Thus, a delay in the musical tone sounding (damping) timing can be eliminated to restore proper timing.

Figure 9:
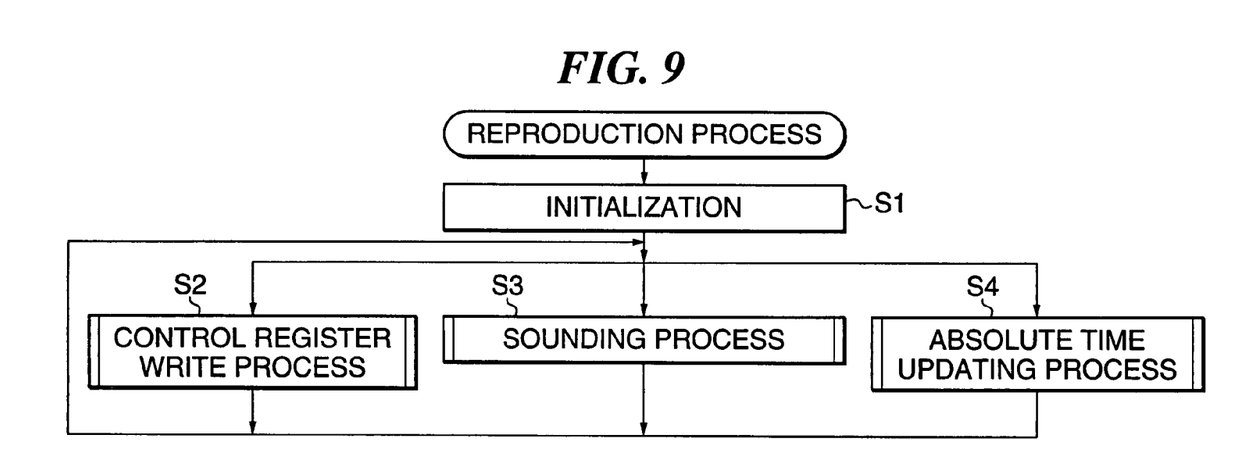
FIG. 9 is a flow chart showing a reproduction process carried out by the musical tone reproducing apparatus.

Next, FIG. 9 is a flow chart showing a reproduction process carried out by the tone generator hardware section 15 of the musical tone reproducing apparatus according to the present embodiment.

If the mobile phone to which the musical tone reproducing apparatus according to the present invention is applied is set such that music informing of an incoming call is reproduced, an instruction for musical tone reproduction is issued upon receipt of an incoming call to start the reproduction process in FIG. 9. In a step S1, initialization processing carried out such that the count values of the duration forward counter 32b and the absolute time counter 32c are reset and the tone generator control register within the tone generator 33 is reset or set to default values, and so forth. Then, a control register process in a step S2, a sounding process in a step S3, and an absolute time updating process in a step s4 are carried out in parallel. The processes in these steps S2 to S4 are repeatedly carried out until the processing of the entire sequence data is completed or an instruction for stopping the processes is issued, whereby musical tones are reproduced based on the sequence data and sounded.

In the control register process in the step S2, a process of reading out event information from the FIFO 30 and writing write data converted from the event information into the tone generator control register is repeatedly carried out whenever the count value of the absolute time counter 32c becomes equal to or more than the count value of the duration forward counter 32b. In the sounding process in the step S3, a musical tone reproducing process based on tone generator parameters read out from the tone generator control register is repeatedly carried out whenever a tone generator parameter is written into the tone generator control register. In the absolute time updating process in the step S4, a process of counting up by "1" the absolute time counter 32c is carried out every unit time.

Figure 10:
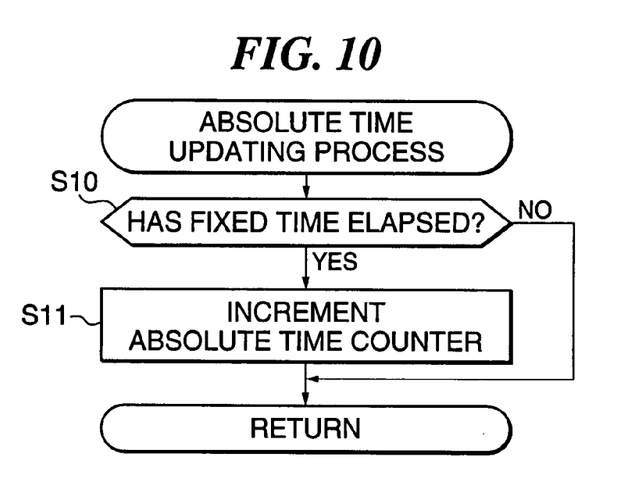
FIG. 10 is a flow chart of an absolute time updating process in the reproduction process carried out by the musical tone reproducing apparatus.

FIG. 10 is a flow chart showing the absolute time updating process.

After an instruction for starting the musical tone reproduction is issued and the initialization processing is carried out, the absolute time updating process in FIG. 10 is started. In a step S10, it is determined whether or not one unit time, which is a constant time period, has elapsed. If the one unit time has not elapsed, the process immediately returns to a location immediately after the step S1 of the reproduction process, whereas, if the one unit time has elapsed, the process proceeds to a step S11, wherein the count value of the absolute time counter 32c, which has been reset to "0" by the initialization processing, is incremented into a count value "1". Then, the process returns to the step S10, whereby the present absolute time updating process is repeatedly executed so that whenever the constant time period elapses, the absolute time counter 32c counts up to increment its count value.

Figure 11:
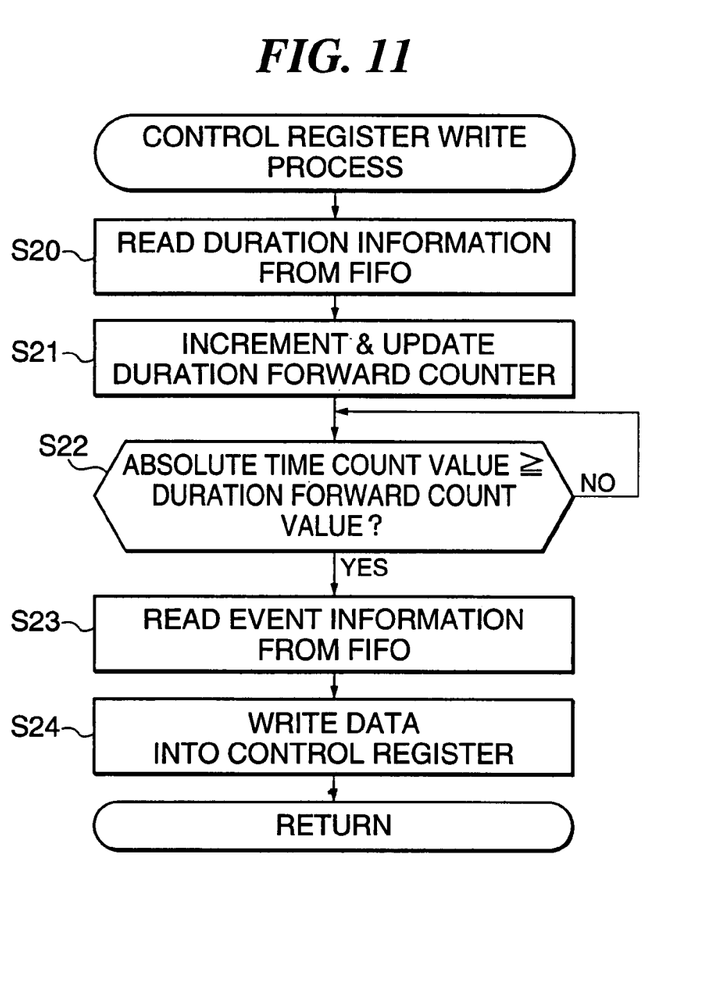
FIG. 11 is a flow chart showing a control register write process in the reproduction process carried out by the musical tone reproducing apparatus.

FIG. 11 is a flow chart showing the control register write process.

After the instruction for starting the musical tone reproduction is issued and the initialization processing is carried out, the control register write process in FIG. 11 is started. In a step S20, sequence data is read out from the FIFO 30. In this case, the readout sequence data is duration information, and in a step S21 duration data outputted from the decoder 32a is added to the count value of the duration forward counter 32b, which has been reset to "0" by the initialization processing. Then, in a step S22, the count value of the absolute time counter 32c and the count value of the duration forward counter 32b are compared with each other. If the comparison result does not show that the count value of the absolute time counter 32c is equal to or more than the count value of the duration forward counter 32b, the process waits for a new comparison result. When the count value of the absolute time counter 32c is incremented by the above described absolute time updating process so that it becomes equal to or more than the count value of the duration forward counter 32b, the process proceeds to a step S23, wherein the significant comparison result i is applied to the FIFO controller 31, whereby event information corresponding to the duration data is read out from the FIFO 30. The readout event information is converted by the decoder 32a into control data of a format peculiar to the tone generator 33 and the converted control data is delivered to the register write controller 32e. Then, in a step S24, a tone generator parameter contained in the control data is written into the tone generator control register at a location indicated by an address contained in the control data. After completion of the process in the step S24, the process returns to the location immediately after the step S1 of the reproduction process. In this way, preparations are made for reproducing a musical tone based on the control data.

Figure 12:
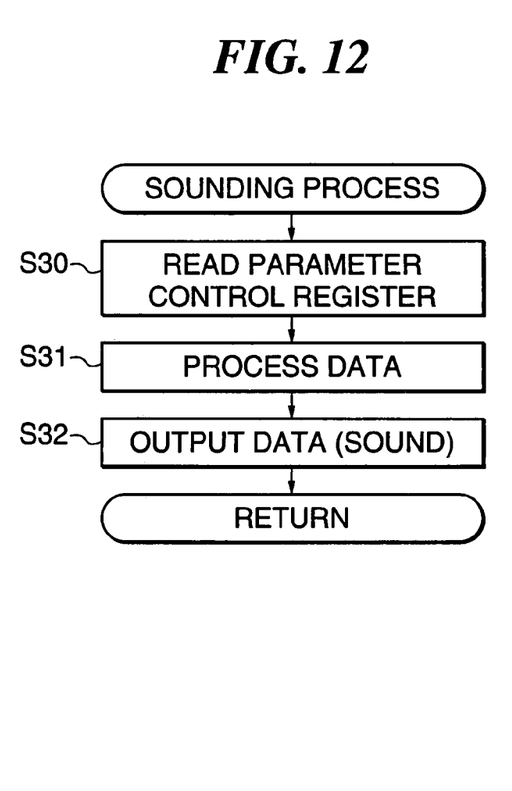
FIG. 12 is a flow chart showing a sounding process in the reproduction process carried out by the musical tone reproducing apparatus.

FIG. 12 is a flow chart showing the sounding process.

After the instruction for starting the musical tone reproduction is issued and the initialization processing is carried out, and then a tone generator parameter is written into the tone generator control register by the above described control register write process, preparations have been made for reproducing a musical tone, and accordingly the sounding process is started. In a step S30, the tone generator parameter is read out from the tone generator control register. Then, in a step S31, data processing is carried out based on the readout tone generator parameter. In this case, if the tone generator parameter is a key-on parameter, data processing is carried out to reproduce a musical tone of a pitch indicated by the key-on parameter with one or more tone colors and volume previously set. Then, in a step S32, data resulting from the data processing is outputted. In this case, if the tone generator parameter is a key-on parameter, reproducing data k for the musical tone to be reproduced is outputted. After completion of the processing in the step S32, the process returns to the location immediately after the step S1 of the reproduction process.

Although the musical tone reproducing apparatus according to the present invention described above is applied to a mobile phone as a portable terminal apparatus, the present invention is not limited to this, but the present invention may be applied to a portable information apparatus capable of outputting musical tones, a portable personal computer capable of outputting musical tones, and the like. Further, music contents data may be reproduced in synchronism with texts or image contents data.

Further, although in the above described embodiment, the decoder 32a of the tone generator hardware section 15 converts sequence data into control data having a format peculiar to the tone generator 33, insofar as the CPU 10 has a surplus capacity, it may be so arranged that the CPU 10 converts sequence data into control data having a format peculiar to the tone generator 33 and stores the same in the RAM 11, while the CPU 10 reads out the data from the RAM 11 and supplies the same to the tone generator control section 15 during reproduction.

This reduces the whole processing amount of the sequencer 32 and hence can shorten the time period required for processing data related to the musical tone reproduction by the sequencer 32. Therefore, by combining the conversion processing by the CPU 10 and the processing of supplying event data from the FIFO 30 to the register write controller 32e when the count values of the absolute time counter 32c and the duration forward counter 32b become equal to each other and the processing of writing the write date j into the tone generator control register by the register write controller 32e, a musical tone reproducing apparatus that is less prone to a delay in the timing of sounding of musical tones can be provided.

The tone generator 33 of the tone generator hardware section 15 may be formed by a tone generator of the frequency modulation type, i.e. an FM tone generator. The FM tone generator utilizes harmonics generated by frequency modulation for synthesis of musical tones, and is capable of generating waveforms having harmonic components containing non-harmonic chords with a simple circuit configuration. The FM tone generator is also capable of generating a variety of musical tones from synthesized tones simulating tones of natural musical instruments to bleeps. The FM tone generator employs oscillators called "operators" that equivalently oscillate sine waves. For example, the FM tone generator may be constituted by a first operator and a second operator which are cascaded with each other. Moreover, the FM tone generator may be constructed such that an output from an operator is fed back to the input of the operator.

The type of the tone generator 33 of the tone generator hardware section 5 is not limited to the FM tone generator type, but may be a waveform memory type (PCM tone generator, ADPCM tone generator), a physical model type, and so forth. In terms of the construction, a hardware tone generator using a DSP or the like may be employed.

INDUSTRIAL APPLICABILITY

As described above, according to the present invention, since timing of reading out next event information is controlled based on the count values of forward counter and time counter, timing of sounding of musical tones is reproduced to proper and original timing even if there are large amount of event information occurring simultaneously and process in the data generator cannot be completed within a unit time.

Further, according to the present invention, when the count value of the time counter becomes equal to or more than the count value of the forward counter, the control data generated from corresponding event information is supplied to the tone generator. By doing so, even if a temporary delay occurs in the timing of supply of the control data in the course of musical tone reproduction, the control data can be supplied to the tone generator in timing indicated by duration information. As a result, the timing of sounding of musical tones reproduced by the tone generator can be restored to proper or original timing.

Therefore, even when in a mobile phone to which the present invention is applied, an image is displayed, the casing of the mobile phone is vibrated or various buttons are lighted on and off in synchronism with the reproduction of incoming call music, a delay in the sounding timing of musical tones can be eliminated to again bring these operations into synchronism with the reproduction of the generation of musical tones.

What is claimed is:

1. A musical tone reproducing apparatus which is connected respectively to an external system controller for carrying out a process other than a musical tone reproducing process as a main process and to an external storage, said external storage storing performance data consisting of event information representative of contents of events and duration information, which is located before the event information, representative of time intervals between occurrence of events and occurrence of immediately preceding events, the event information and the duration information being alternately arranged, and said musical tone reproducing apparatus performing reproduction of musical tone based on the performance data supplied from said external storage, comprising:

a first-in first-out temporary storage for temporarily storing the performance data supplied sequentially from said external storage by a predetermined amount at a time;

a forward counter for sequentially accumulating the duration information read out from said first-in first-out temporary storage to indicate a count value of time at which musical tones are to be generated based on the event information corresponding to the duration information;

a time counter for counting up at intervals of a unit time to indicate a count value of absolute time;

a readout controller for comparing the count value of said time counter with the count value of said forward counter, and for controlling said first-in first-out temporary storage to read out next event information to be read out and duration information following the next event information stored in said first-in first-out temporary storage based on results of the comparison between the count values of said time counter and of said forward counter;

a data generator for generating control data based on the event information read out and transferred from said readout controller; and a tone generator for generating musical tones based on the control data.

2. A musical tone reproducing apparatus which is connected respectively to an external system controller for carrying out a process other than a musical tone reproducing process as a main process and to an external storage, said external storage storing performance data consisting of event information representative of contents of events and duration information, which is located before the event information, representative of time intervals between occurrence of events and occurrence of immediately preceding events, and the event information and the duration information being alternately arranged, comprising:

a first-in first-out temporary storage for storing control data supplied sequentially from said external storage by a predetermined amount at a time when musical tones are reproduced, the control data being generated by said external system controller based upon the performance data before reproducing musical tones, and the control data including duration information and event information stored in said external storage;

a forward counter for sequentially accumulating the duration information read out from said first-in first-out temporary storage to indicate a count value of time at which musical tones are to be generated based on the event information corresponding to the duration information;

a time counter for counting up at intervals of a unit time to indicate a count value of absolute time;

a readout controller for comparing the count value of said time counter with the count value of said forward counter, and for controlling said first-in first-out temporary storage to read out next event information to be read out and duration information following the next event information stored in said first-in first-out temporary storage based on results of the comparison between the count values of said time counter and of said forward counter; and a tone generator for generating musical tones based on the read out event information.

3. A portable terminal apparatus having a musical tone reproducing apparatus as claimed in claim 1, wherein said system controller carries out a portable terminal function process as the main process.

4. A musical tone reproducing apparatus as claimed in claim 1, wherein said readout controller controls said first-in first-out temporary storage to read out the event information when the count value of said time counter becomes equal to or more than the count value of said forward counter.

5. A tone reproducing method applied to a musical tone reproducing apparatus which is connected respectively to an external system controller for carrying out a process other than a musical tone reproducing process as a main process and to an external storage, said external storage storing performance data consisting of event information representative of contents of events and duration information, which is located before the event information, representative of time intervals between occurrence of events and occurrence of immediately preceding events, the event information and the duration information being alternately arranged, and the musical tone reproducing apparatus performing reproduction of musical tone based on the performance data supplied from said external storage, comprising:

a temporarily storing step of temporarily storing the performance data supplied sequentially from said external storage by a predetermined amount at a time in a first-in first-out temporary storage;

a forward counting step of sequentially accumulating the duration information read out from said first-in first-out temporary storage to indicate a count value of time at which musical tones are to be generated based on the event information corresponding to the duration information;

a time counting step of counting up at intervals of a unit time to indicate a count value of absolute time;

a readout controlling step of comparing the count value of said time counting step with the count value of said forward counting step, and of controlling said first-in first-out temporary storage to read out next event information to be read out and duration information following the next event information stored in said first-in first-out temporary storage based on results of the comparison between the count values of said time counting step and of said forward counting step;

a data generator for generating control data based on the event information read out and transferred from said readout controlling step; and a tone generating step of generating musical tones based on the control data.

* * * * *